(12) United States Patent
Chien

(10) Patent No.: US 9,436,011 B2
(45) Date of Patent: Sep. 6, 2016

(54) LED LIGHT HAS COLORFUL KALEIDOSCOPE IMAGE AND MEANS

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 14/559,444

(22) Filed: Dec. 3, 2014

(65) Prior Publication Data
US 2015/0219903 A1    Aug. 6, 2015

Related U.S. Application Data

(63) Continuation-in-part of application No. 14/024,229, filed on Sep. 11, 2013, now Pat. No. 9,274,342, and a continuation-in-part of application No. 13/021,124, filed on Feb. 4, 2011.

(51) Int. Cl.
| | | |
|---|---|---|
| G03B 21/28 | (2006.01) | |
| G02B 27/08 | (2006.01) | |
| G03B 21/20 | (2006.01) | |

(52) U.S. Cl.
CPC .......... *G02B 27/08* (2013.01); *G03B 21/2033* (2013.01); *G03B 21/2053* (2013.01); *G03B 21/28* (2013.01)

(58) Field of Classification Search
CPC ....... F21V 21/00; G02B 27/08; G03B 21/28; G03B 21/2053; G03B 21/2033
USPC ...... 353/1, 2; 359/616, 617; 362/208.1, 202, 362/204, 205, 550, 559.05, 559.14
See application file for complete search history.

(56) References Cited

U.S. PATENT DOCUMENTS

| | | | | |
|---|---|---|---|---|
| 4,733,960 A * | 3/1988 | Bennett | ................... | 353/1 |
| 4,776,653 A * | 10/1988 | Kaplan | ................ | 359/616 |
| 5,191,368 A * | 3/1993 | Kalua et al. | ............... | 353/2 |
| 7,632,004 B2 * | 12/2009 | Chien | ................ | 362/641 |
| 7,832,917 B2 * | 11/2010 | Chien | ................ | 362/641 |
| 7,832,918 B2 * | 11/2010 | Chien | ................ | 362/641 |
| 7,871,192 B2 * | 1/2011 | Chien | ................ | 362/641 |
| 7,900,384 B2 * | 3/2011 | Schnuckle | .............. | 40/324 |
| 8,002,456 B2 * | 8/2011 | Chien | ................ | 362/640 |
| 8,083,377 B2 * | 12/2011 | Chien | ................ | 362/276 |
| 8,128,274 B2 * | 3/2012 | Chien | ................ | 362/641 |
| 8,157,380 B2 * | 4/2012 | Peffer et al. | ............. | 353/1 |
| 8,231,246 B2 * | 7/2012 | Chien | ............. | 362/249.02 |
| 8,231,260 B2 * | 7/2012 | Chien | ................ | 362/640 |
| 8,277,087 B2 * | 10/2012 | Chien | ................ | 362/298 |
| 8,303,150 B2 * | 11/2012 | Chien | ................ | 362/555 |
| 8,408,736 B2 * | 4/2013 | Chien | ................ | 362/235 |
| 8,469,526 B1 * | 6/2013 | Chung | ................ | 359/617 |
| 8,511,877 B2 * | 8/2013 | Chien | ................ | 362/555 |
| 8,702,245 B2 * | 4/2014 | Chien | ................ | 353/85 |
| 8,714,799 B2 * | 5/2014 | Chien | ................ | 362/555 |
| 8,721,160 B2 * | 5/2014 | Chien | ................ | 362/641 |
| 2003/0169501 A1 * | 9/2003 | Nelson | ................ | 359/616 |
| 2009/0284960 A1 * | 11/2009 | Chien | ................ | 362/157 |
| 2012/0200828 A1 * | 8/2012 | Chien | ................ | 353/1 |

* cited by examiner

*Primary Examiner* — William C Dowling
(74) *Attorney, Agent, or Firm* — Bacon & Thomas, PLLC

(57) ABSTRACT

An LED light device that projects a kaleidoscopic image includes multiple reflective or retro-reflective elements for generating multiple images of at least one object, a projection device for projecting the multiple images, and a changing mechanism or circuit for moving the at least one object or changing a pattern of turned-on LEDs that illuminate the object.

20 Claims, 9 Drawing Sheets

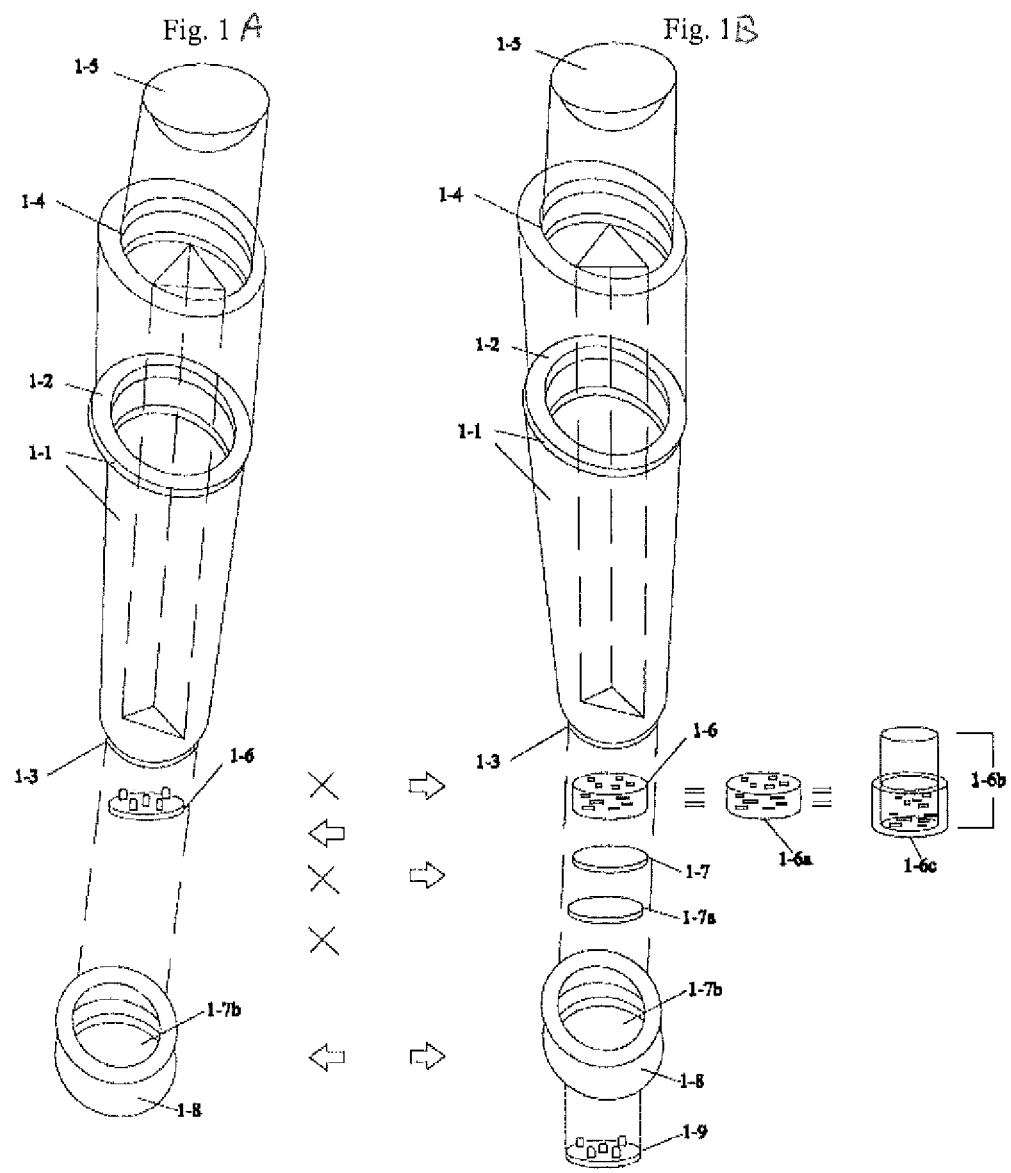

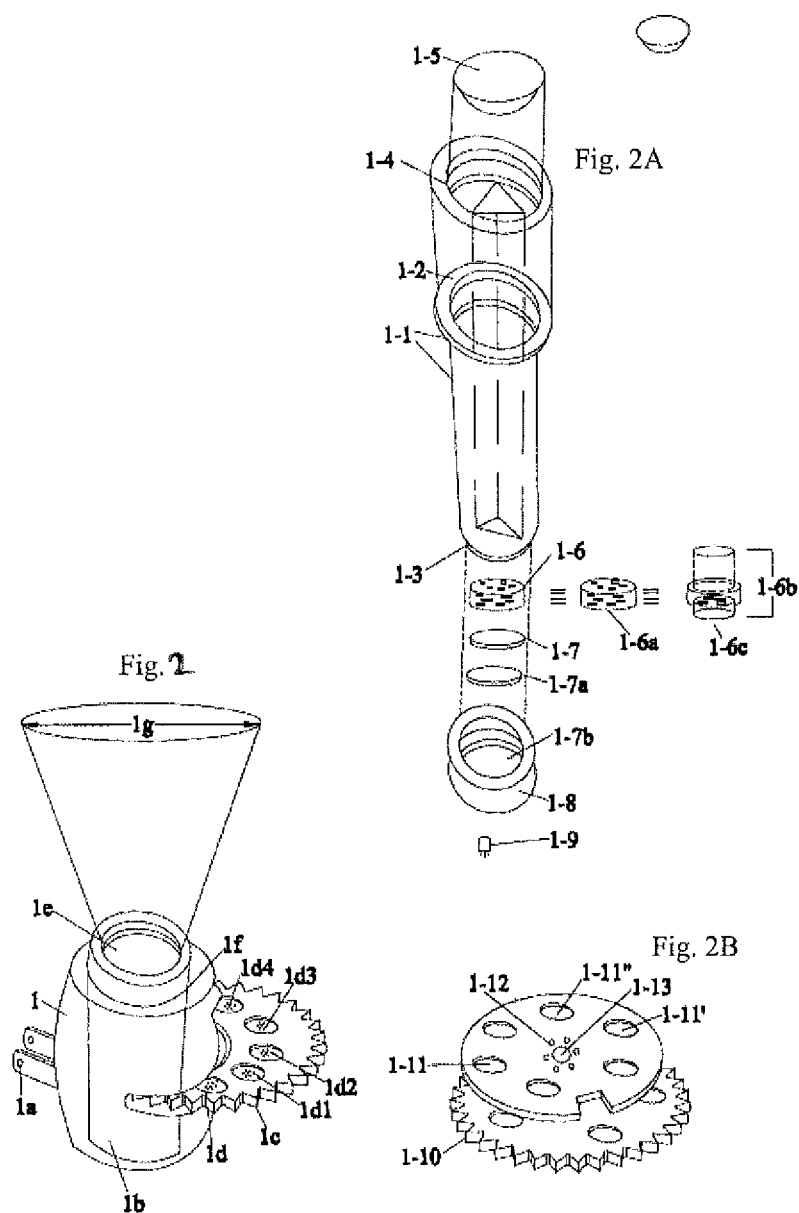

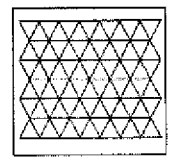
Fig. 3
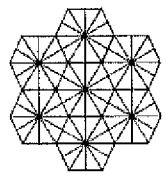
Fig. 4
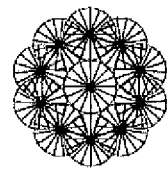
Fig. 5
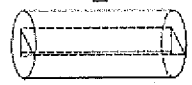
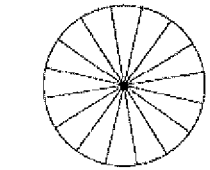
Fig. 6
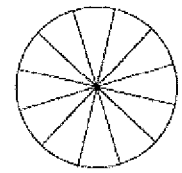
Fig. 7
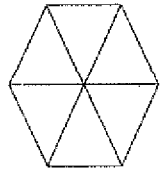
Fig. 8
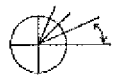
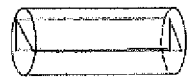
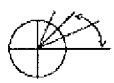
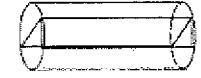
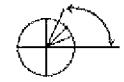
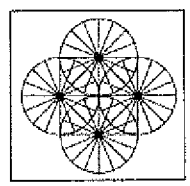
Fig. 9
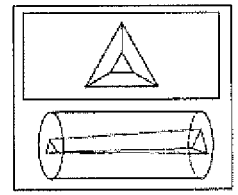
Fig. 10
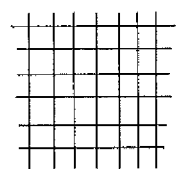
Fig. 11

LED LIGHT HAS COLORFUL KALEIDOSCOPE IMAGE AND MEANS

This application is a continuation-in-part of U.S. patent application Ser. No. 14/024,229, filed Sep. 11, 2013, and a continuation-in-part of U.S. patent application Ser. No. 13/021,124, filed Feb. 4, 2011.

BACKGROUND OF THE INVENTION

This application has subject matter in common with the following patent applications of the inventor:

(A) U.S. patent application Ser. No. 12/710,918, now U.S. Pat. No. 8,277,087, discloses an LED light that includes a kaleidoscope means having more than one reflective means in the form of mirrors or mirror-like means assembled into the kaleidoscope means.

(B) U.S. patent application Ser. No. 11/806,284, now U.S. Pat. No. 7,632,004, discloses an LED light that utilizes an optics means in front of or in back of kaleidoscope means to create, adjust, magnify, reduce, or enlarge an image, LED light beams, or an LED lights' image or shape, and which may include any combination of one or more optics lens, optics mirror, laser hologram, laser grating, or film optics assembly.

(C) U.S. Pat. No. 7,455,444 discloses an LED light that uses more than one LED in a matrix arrangement and that may include parts and accessories such as a circuit means, IC means, sensor means, switch means, brightness control means, color mixing means, color selection means, color freeze means, motor means, gear means, and turn-on and turn-off means to cause a certain number of the LEDs to turn-on with a desired color, brightness, light output, light functions, or matrix combination to obtain desired light patterns, and which may further include a motor means, rotating means, or gear set means.

(D) The LED projection devices disclosed in the inventor's U.S. patent application Ser. Nos. 12/948,953; 12/938,564; 12/886,832; 12/876,507; 12/771,003; 12/624,621; 12/914,584; 12/318,471; 12/318,470; and 12/834,435 also have subject matter in common with the present invention.

Additional light devices with projection features that may be utilized by the present invention are also disclosed in the following U.S. patent applications of the inventor:

(1) U.S. patent application Ser. No. 12/232,505 (now U.S. Pat. No. 7,832,917);

(2) U.S. patent application Ser. No. 12/318,473 (now U.S. Pat. No. 7,832,918);

(3) U.S. patent application Ser. No. 12/876,507 (now U.S. Pat. No. 8,083,377); with (4) U.S. Ser. No. 12/292,153 (now U.S. Pat. No. 7,871,192);

(5) U.S. patent application Ser. No. 12/318,471 (now U.S. Pat. No. 8,002,456);

(6) U.S. patent application Ser. No. 12/907,443 (now U.S. Pat. No. 8,128,274);

(7) U.S. patent application Ser. No. 12/940,255 (Now U.S. Pat. No. 8,231,246) LED night light has laser means (8) U.S. patent application Ser. No. 13/019,331 (now U.S. Pat. No. 8,231,260);

(9) U.S. patent application Ser. No. 12/624,621 (now U.S. Pat. No. 8,303,150);

(10) U.S. patent application Ser. No. 12/771,003 (now U.S. Pat. No. 8,408,736);

(11) U.S. patent application Ser. No. 13/540,689 (now U.S. Pat. No. 8,511,877);

(12) U.S. patent application Ser. No. 13/021,107 (now U.S. Pat. No. 8,702,245);

(13) U.S. patent application Ser. No. 13/534,611 (now U.S. Pat. No. 8,714,799);

(14) U.S. patent application Ser. No. 12/914,584 (now U.S. Pat. No. 8,721,160);

(15) U.S. patent application Ser. No. 12/886,832;

(16) U.S. patent application Ser. No. 12/938,564;

(17) U.S. patent application Ser. No. 12/948,953.

Light devices having interchangeable power sources for wall outlet AC power and energy storage means (DC), including any combination of prong means, an extension cord, adaptor, or transformer, solar and wind power sources, batteries, and chemical or biological power sources, and which can be used in connection with a projection light device having built-in kaleidoscope means, are disclosed in the inventor's U.S. patent application Ser. No. 12/940,255 (now U.S. Pat. No. 8,231,246); Ser. No. 12/914,584 (now U.S. Pat. No. 8,721,160); and Ser. No. 12/622,000 (now U.S. Pat. No. 8,434,927).

The present invention can utilize any of the concepts disclosed in the above-listed patent applications, including the concepts of a (1) projection light device, (2) more than one optics means, (3) more than one LED, (4) more than one reflective means, (5) interchangeable power sources, (6) laser means, (7) adjustable focus and positioning, and (8) a motor and gear set for providing movement.

U.S. Pat. No. 2,604,812, which issued in 1952, discloses a kaleidoscopic projection light device with an out-of-date design that has the following disadvantages:

(1) the projection light device disclosed in the '812 patent uses a very hot incandescent bulb as a light source and therefore must put the hot light source on the side to prevent heat from the bulb from melting the display unit, in contrast to the current invention in which the light source is right under the display-unit or miniature-means because the LEDs used as the light source have no heat issues that would cause the display-unit including a film or slide or miniature-means to melt. (2) Because the hot light source disclosed in the '812 patent is put on the side and the light source has a radiant light output, a lot of light beams are wasted and the resulting image is dim and not easily recognized, in contrast to the current invention's LED light source, which has a very narrow light emitting angle. (3) The projection device of the '812 needs to use an expensive bellows (39) to cause the light beams to change direction in order to project an image on a board (12), in contrast to the light device of the current invention, in which all light beam travel along a straight path and hit the optics means and projection surface at close 90 degree, without the need for tilted elements to cause the light beams change direction.

(4) Unlike the current disclosure, the '812 patent does not provide for a light-passing-piece, colorful display-unit, or miniature-means to create a colorful, sharp, enlarged size image that can be project an image of up to 18 inches in height over a distance of 6-12 feet to a surface such as a ceiling, because the projection device described in the '812 patent is limited in length, the resulting total concept, application, construction, features, light source, display-unit, moving display-unit or miniatures means described in the present application thus being totally different than the projection device of the '812 patent, The current invention using the display-unit or miniature means to add color and even when the light source includes white LEDs for the brightest light beams.

(6) The light source of the projection device disclosed in the '812 patent has high power consumption, whereas the low-power LEDs described in the current application may use a transformer with adaptor, invertor from 110 Volt AC to 5 Volt DC inverter, or other low voltage or DC sources.

(7) The projection device of the '812 patent requires use of an AC outlet power source for the bulb, in contrast to the current invention which can being the form of a plug-in model having a circuit to convert 110 VAC to DC current or a battery-powered device.

The inventor's U.S. patent application Ser. No. 14/024,229, filed Sep. 11, 2013, discloses an LED device having kaleidoscope means, which can incorporate (1) a traditional kaleidoscope-means and variety of constructions, (2) the LED light device, (3) changing-means to cause an inner-medium to change position, orientation, or relations, (4) a control means to control the changing-means, light functions, brightness, color, and/or light effects, (5) a projection assembly with optics-means and parts and accessories, and (6) a power source to enable the LED device with kaleidoscope means to be turned on for a desired hours in order to provide illumination.

The inventor's U.S. patent application Ser. No. 13/021,124, filed Aug. 9, 2012, (the '124 application) discloses an LED light having a changeable image and pattern, which differs from the LED light disclosed in the inventor's aforementioned U.S. patent application Ser. No. 14/024,229 (the '229 application) in that the LED light device disclosed in the '124 application has a plurality of colorful LEDs that serve both as a light source and also as the display-unit to save the cost for the display-unit. Because there is no inner medium, a changing display is accomplished by changing the LEDs' color, brightness, turn-on and turn-off timing or sequence. The LEDs can have any spatial arrangement, colors, brightnesses, or matrix shape which, when projected through the kaleidoscope means with optional proper optics, results in projection of colorful, splendid, eye-catching light effects, functions, and performance to desired areas including a ceiling, walls, or floor.

The present invention also differs from the LED device disclosed in the inventor's '229 application in the following ways:

(A) A main feature is to use an LED arrangement or assembly to eliminate an inner medium/display unit of the type disclosed in the '229 application so as to offer much brighter light beams and increase the visibility of a projected image, the visibility of the image depending on the number of LEDs, which can be any number up to hundreds.

(B) Another feature is to save the cost of designing and constructing an inner medium/display unit, since the LED light described herein only needs to have an IC means, circuit means, control means, sensor means, and/or switch means to control the plurality of LEDs to provide a changeable LEDs-assembly that emits colorful light and that can be arranged in any geometric shape, a kaleidoscope means made up of multiple mirror-like reflective means to reflect the LEDs' image back and forth to form the kaleidoscopic image and, optionally, an optics means to create a changeable, colorful, splendid kaleidoscope image at desired locations. Thus, the light device described in the inventor's '229 application improves upon the light device described in the inventor's '124 application to create more features with a simpler construction that nevertheless provides more splendid, colorful eye-catching kaleidoscope lighting effects.

The conventional kaleidoscope for kids has been used since 1816 in England and became a popular item in 19th century China and worldwide. However, the conventional kaleidoscope is not capable of providing a kaleidoscope image that can be seen under a dark environment by providing an image that is super large, clear, sharp, focused, colorful, able to have multiple shapes, and which may be transmitted through an optics lens to help to let light from the tiny LEDs become generate a plurality of kaleidoscope images from an outlet or desk top that are capable of reaching the top ceiling, walls, and/or floor depending on the design or position of an adjustment means.

The current Invention utilizes features from both the '124 and '229 applications of the inventor and adds incorporation of a moving means such as a motor means, clock movement means, spin mean, rotating means, magnet and coil means, and vibration means to cause a display-unit, miniature-means, or liquid means having a different density or container with colorful light transmitting means to change position, orientation, or relationship and let people see continuously changeable patterns changeable steady-state kaleidoscope patterns that are colorful, varied, in sharp focus, detailed, and super large, at a desired location and projected from a plug-in, desk top, battery operated, USB powered, or other DC or AC powered LED light device.

The kaleidoscope described herein can have many different constructions and performance depending on market requirements. For example, preferred kaleidoscope parts and accessories may be selected from the following:

(K1) mirror-like reflective means, mirrors, plastic mirrors, or metal mirrors;

(K-2) a display-unit, film, slide, printed piece, color and light transmitting piece, miniature means, dichroic glass, prism, spectrum, color glass, glass ball, dried flowers, papers, sands, oils with different density, liquid compounds, miniature stuff, plastic pieces, color pieces, transparent pieces, translucent pieces, colorful pieces, or any small pieces objects; and (K-3) a space for an inner-medium or a box, container, or sealed-housing.

The kaleidoscope parts and accessories of the present invention will enable a greater number of more colorful images to be projected than is possible from a tiny display-unit with miniature means, making the images more exciting and attractive to people, while utilizing a simpler image projection to enlarge and project the images to any desired surface.

The preferred kaleidoscope construction may be selected from (a) a three mirror-like reflective means system, (b) a two mirror-like reflective means system, (c) a four mirror-like reflective means system, (d) a tapered mirror-like reflective means system, (e) a circular mirror-like reflective means system, and (5) any other construction having a desired number of mirror-like reflective means and adjacent connecting angles for the mirror-like reflective means so that images created by the respective kaleidoscope-means assemblies exhibit kaleidoscopic patterns.

Although the above-described '124 and '229 patent applications of the inventor disclose LED light means for projecting a kaleidoscope-means' image, they do not teach details of a moving means for causing a display-unit or miniature means to change its position, orientation, or relationship to other means. In contrast, the current invention can incorporate moving means, which may be selected from motor means, gear set means, a clock movement, spin means, rotate means, or vibration means for continuous or intermittent, or timed movement, to cause the kaleidoscope image to change patterns on a desired surface with a desired power supply such as plug-in outlets to get continuous power to turn on the inner super bright LED(s). It will be appreciated that power may also be supplied by conventional batteries, an adaptor, transformer, or generator, chemical power, rechargeable batteries, or any power source available from the marketplace, and further that the LED light or light device may be positioned on a desk top plugged-into a wall outlet, or installed on any surface and used for any purpose.

The LED light means of the current invention can use LEDs having any shape, specification, size, style (one chip, multiple chips, or built-in IC), including a super bright or high power LED or an assembly with a plurality of LEDs that can offer sufficient brightness to be incorporated with the inventors projection means described in copending or earlier patent applications of the inventor. The term LED assembly refers to an assembly having many LEDs arranged in any geometric shape to emit light beams to an inner-medium, display-units, miniature means, /or color and light transmitting means.

The current invention's projected image is bigger than the display-unit or matrix-LEDs' original size by up to ten to a hundred times, the image being projected from a low height of around 18" (the location of a wall outlet) or 30" (the height of a desktop) to the 6-12 feet height of a ceiling or other walls. The image will not appear on the same side of the outlet location or at a distance of less than one feet from the LED light unit.

The image may include any geometric shape, including by way of example and not limitation the images created by one of the preferred kaleidoscope means shown in FIGS. 3 to 11, which correspond to those shown in the inventor's U.S. Patent Application Publication No. 2012/0200828, depending on the arrangement or assembly of the said mirror-like reflective means optics means, mirror means, or reflective means, any of which may be varied without departing from the scope of the current invention, which may also include any of the optics means, LED means, LED assemblies, display units, miniature means, color and light transmitting means, or inner media disclosed in the inventor's prior, copending, or patented applications.

In addition to the above, the light device of the present invention may include any combination of the following 28 features or arrangements:

1. An LED light with kaleidoscope means that includes at least one LED as a light source to supply visible light beams and at least one kaleidoscope means including an assembly or arrangement which has more than one mirror-like reflective-means and a certain length to cause an image of an object at one end to be reflected and/or retro-reflected multiple times within the length of the more than one mirror-like reflect-means to create a colorful plurality of images of the object to appear at the other end of the elongate mirror-like reflect means, the number of the object's images depending on the length and the construction of the mirror-like reflect-means; and at least one projection means to project the plurality of object's images from an LED light located at a wall outlet (around 18 inches from the floor) or on a desktop surface (around 25 to 50 inches from the floor) to a surface located 2-30 feet away, and to magnify the tiny object-image(s) to create a super big size, clear, sharply focused, colorful image at a desired angle, position, and orientation determined by adjustment means, the surface to which the images are projected being selected from a top ceiling, walls adjacent to the outlet, a floor, and any other surface 2-30 feet away from the LED light location.

The object of this arrangement is preferably colorful and may be selected from a display-unit, miniature means, film, slide, printed plastic piece, colorful and light transmitting means (such as colorful transparent pieces or pieces of paper, or assorted liquids with different densities, with or without stuff or reflective means inside), or other means which can fit into the space of an inner-medium, box, case, or compartment.

The optics means of this arrangement may be selected from an optics lens, a convex or concave lens, a lens assembly, telescope means, tube means, housing means, and/or reflector means to cause light beams to become parallel (a convex lens or lens assembly), refract (an optics lens, lens assembly, or convex lens), or reflect (reflector means), concentrate (a convex lens, lens assembly, or optics lens) or not leak out (a tube or telescope means) and thereby cause the object-image to become larger with no dark areas for the best function, effect, and performance.

The mirror-like reflect-means may include any combination of the following:

(a) a three mirror-like reflect means system,
(b) a two mirror-like reflect means system,
(c) a four mirror-like reflect means system,
(d) a tapered mirror-like reflect means system,
(e) a circular mirror-like reflect means system, and
(f) any other construction having desired number of the mirror-like reflect means and/or any adjacent connect-angle of each of the mirror-like reflect-means.

This arrangement also may include at least one power source, circuit means, control means, changing means, IC means, sensor means, switch means, trigger means, remote control means, Bluetooth means, PIR means, infrared means, timer means, and adjust means to adjust an angle, position, orientation, or focus of the image and cause the at least one LED to exhibit desired light functions, timing, colors, and brightness to achieve a variety of kaleidoscopic images.

2. An LED light with kaleidoscope means that includes at least one LED arranged as a light source to supply visible light beams and emit the light beams to at least one object, inner-medium, display-unit, miniature-mean, or colorful light transmitting means positioned above the at least one LED at one end of the kaleidoscope-means, the lighted object's image being reflected or retro-reflected within the elongate length of a more than one mirror-like reflect-means arrangement or assembly to create a plurality of the object's image at the other end of the kaleidoscope-means, and the plurality of kaleidoscope-images passing through the optics means to be enlarged with predetermined or adjustable focus so that the images are large in size, clear, sharply focused, and colorful within a geometric contour range based on kaleidoscope-image forming theory and skill. This arrangement can also use any of the optics means and mirror-like reflect means combinations described above in connection with arrangement #1, but with the power source being provided by plugging the LED light into an electrical outlet. . . . s.

3. An LED light with kaleidoscope means that includes at least one LED arranged as a light source to supply visible light beams and emit the light beam to at least one object, inner-medium, display-unit, miniature-mean, or colorful light transmitting means (for example, a liquid having different densities, colors, and/or inner stuff), the at least one object being positioned above the at least one LED at one end of the kaleidoscope-means, the lighted object's image being reflected or retro-reflected within the elongate length of a more than one mirror-like reflect-means arrangement or assembly to create a plurality of the object's kaleidoscope-image at the other end of the kaleidoscope-means and the plurality of kaleidoscope-images passing through an optics means to be enlarged with predetermined or adjustable focus so that the images will be large in size, clear, sharply focused, and colorful as described above in connection with arrangement #2, including any of a variety of optics means and reflect means combinations, but with the power source being a direct current power source such as a battery, USB power source, solar power source, chemical power source, generator, AC to DC transformer, AC adaptor with a jack, or any other direct current power for desktop applications or indoor or outdoor use.

4. An LED device with kaleidoscope-means for creating colorful images including:
(1) a traditional kaleidoscope-means having more than one reflect-means and a desired variety of constructions,
(2) an LED light means that offers sufficient brightness and emits light beams to the kaleidoscope means' objects, colorful miniature-means, inner-medium, display-unit, colorful light transmitting means, or liquid having different densities with desire stuff floating therein,
(3) a changing-means to cause the kaleidoscope-means' objects, inner-medium, display-unit, miniature-means, colorful light transmitting means, or liquid having different densities and stuff, to change position, orientation, relationship, or relative position, or to change at least one LED's color, turn on time, duration, brightness, sequence, order, function, and/or flashing, chasing, fade in and fade out, grating, random flashing, or pair flashing effects, which are available from the marketplace for LED light shows,
(4) a control means selected from one or more of a sensor means, switch means, remote control means, Bluetooth means, Wifi means, sensor means, IC means, circuit means, trigger means, motor means, gear means, image angle, position, or focus adjustment means, or image direction, orientation, or projection angle adjustment means to control the changing-means, light functions, brightness, color, light effects, and light performance,
(5) a projection assembly with optics-means and parts and accessories to project the colorful kaleidoscope-means image to at least one desired surface that is 2-30 feet away from the location of the LED light, and
(6) a power source to cause the LED device with kaleidoscope means to offer illumination at desired times.

5. The LED light with kaleidoscope-means as described above may incorporate moving means selected from a motor means, clock movement means, spin means, rotate means, vibration means, bumper means, gear set means to cause the display-unit or miniature means or colorful light transmitting means to change position, location, orientation, or relationship and thereby change the kaleidoscope pattern.

6. The LED light with kaleidoscope-means as described above may include any power source selected from a prong means to get power from an AC electrical outlet or USB power from a USB receiving port and male port, an adaptor means to get power from a transformer, a power storage means for solar power, batteries, a generator power, a chemical power source, a water power source, an energy power bank, or other stored energy power source.

7. The LED light with kaleidoscope-means as described above may include both fixed and moving pieces to create colorful, enlarged, special kaleidoscope-images.

8. The LED light with kaleidoscope-means as described above may include a mirror-like reflector that reflects a very clear image without any image changing.

9. The LED light with kaleidoscope-means as described above may include an elongate or tube-like means with more than one mirror-like reflective means arranged along an interior thereof.

10. The LED light with kaleidoscope-means as described above may include an elongate or tube-like means to prevent light beams from leaking out of the said elongate or tube-like means.

11. The LED light with kaleidoscope-means as described above may be arranged to cause light beams from at least one LED light source to pass though a top location of at least one of a display-unit or object having a desired color(s), art(s), image(s), movie, motion picture, digital data on a display means, geometric shape, words, signals, time, weather, or message and at least one tube-like means to arrange the display-unit(s) and the at least one optical means to cause the lighted display-unit(s)' image(s) to be magnified by optics means and form a bigger size, clearer image, the optics means selected from a convex lens, concave lens, or lens assembly.

12. The LED light with kaleidoscope-means as described above may include a desired number and angle arrangement of the mirror-like reflective means to cause an object's image to be reflected or retro-reflected a desired number of time to form a plurality of images of the object.

13. The LED light with kaleidoscope-means as described above may include an image projection means for projecting an image of an illuminated display-unit(s) which, through the preferred kaleidoscope, becomes a plurality of images of the display-unit(s) and, through a refraction lens, is transformed into a bigger, more colorful, more clearly focused image for display on a surface which is far away from the LED light, the image location being changeable to anywhere by adjustment means.

14. The LED light with kaleidoscope-means as described above may include an elongate or tube-like means having a preferred length to form different images even when the dimensions of the light device are made super compact by minimizing the length of the elongate or tube-like means.

15. The LED light with kaleidoscope-means as described above may include any angles of mirror-like reflective means to create the different images.

16. light with kaleidoscope-means as described above may use 3 mirror-like reflective means arranged in an equilateral triangle (each adjacent angle is 60 degrees), an isosceles triangle or a right triangle to form a certain kaleidoscope boundary to enable a splendid image to be seen.

17. The LED light with kaleidoscope-means as described above may include kaleidoscope objects illuminated by at least one LED to form a lighted colorful image, the objects including light transmitting materials available from the marketplace in all kinds of shapes or geometric designs.

18. The LED light with kaleidoscope-means as described above may include a luminescent or self-glowing light source, an LED light, an LED-unit, an OEL light, an OLED, or other light source which does not create heat that might cause the display-unit(s) to be damaged, deformed, lose color, fade out, melt, or soften.

19. The LED light with kaleidoscope-means as described above may use rotating means, vibration means, spin means, tilt means, or magnet and coil means (electric and magnetic field reaction) to cause the display-unit(s) or objects to change position and enable different kaleidoscope images to be projected by an optics lens.

20. The LED light with kaleidoscope-means as described above may include an LED light device that applies at least two optics principles:
(1) the principle of using kaleidoscope mirror-like reflective means to create a plurality of images at the image output end, and (2) the principle of using an optics-lens to cause the images at the output end of the kaleidoscope means to be refracted and form a big and clear image.

21. The LED light with kaleidoscope-means as described above may be plugged into an outlet such as a wall outlets, power strip outlet, or power source outlets.

22. The LED light with kaleidoscope-means as described above may be battery operated and get power from a USB port, batteries, or any kind of wireless charging system.

23. The LED light with kaleidoscope-means as described above may be arranged so as not to project an image to a surface near the wall outlet into which the LED light is plugged because it is too close and not suitable for showing a big image without deformation.

24. The LED light with kaleidoscope-means as described above may project an image through an optics lens such as a convex lens, concave lens, or lens assembly with focus calculation for the display-unit(s) and image(s).

25. The LED light with kaleidoscope-means as described above may project the image to any combination of surfaces such as an opposite wall, surrounding walls, a top ceiling, and the floor, but not the wall on which the outlet is located.

26. The LED light with kaleidoscope-means as described above may be arranged to display an image in a dark environment, space, or location, or even in bright-areas, depending on how bright the LED or LEDs used to as the light source.

27. The LED light with kaleidoscope-means as described above may include a self-illuminated object(s) or display-unit(s) or be illuminated by a light source(s) that can be turned-on and turned-off by circuit means.

28. The LED light with kaleidoscope-means as described above may include a sensor means selected from Bluetooth means, motion sensor means, infrared sensor means, remote control means, wireless control means, wired control means, electric-switch means, or mechanical switch means, and/or incorporated with a timer or integrated circuit for different applications, functions, and effects.

Some of the features that may be included in the invention are also described in the inventor's prior or copending patent applications or patents, which include LED lights having the following combinations of elements:

(1) at least one LED or matrix of LEDs arranged as a light source to supply visible light beams;

at least one optics means for projecting a kaleidoscope-means image to a desired surface, the optics means selected from the group consisting of an optics lens, a convex or concave lens, a lens assembly, telescope means, a film, a display-unit, a transparent material, and a translucent material, laser created means, lenticular means, a grating film, hologram means, Lcos means, digital data means, screen-means, and display-means, the image being formed by light from the at least one LED passing thought transparent areas, openings, or cut outs, or the above-listed hologram means, laser created means, lenticular means, grating film, Lcos means, digital data means, screen-means, or display-means, or a kaleidoscope-means, kaleidoscope parts and accessories, or projection-means in the LED device, the image being selected from the group consisting of a message, data, logo, time, art, geometric shape(s), and any other image desired to be projected onto the desired surface, the desired surface selected from the group consisting of a ceiling, a wall, a floor, and any other surface; and at least one power source, circuit means, control means, changing means and trigger means arranged to cause the at least one LED or matrix of LEDs to exhibit desired light functions, timing, colors, brightness, illumination, images, and a variety of kaleidoscopic images.

The current invention may advantageously use a matrix of LEDs as a light source because it is difficult to achieve a required brightness with a one LED whereas a plurality of LEDs will easily offer the required brightness. Also, while a super power LED might have very high brightness, it also creates very high temperatures, while a plurality of lower power LEDs will reduce the heat issues.

Furthermore, the use of a matrix of LEDs having desired specifications, size, brightness, colors, and a built-in IC can eliminate the need for an inner-medium or display-unit, or an adjustable or movement means for moving an inner-medium or display-units to create a next image. The matrix of LEDs acting as an inner-medium or display-unit can easily achieve an image change simply by turning on and off a desired number of LEDs by circuit means, IC means or other electric parts and accessories. Hence, use of a matrix of LEDS in place of an inner-medium or display-units can provide tens of millions of different LED combinations controlled by a simple circuit. Hence, the matrix of LEDs can have the effect of an unlimited number of changes in a display-unit without moving means, vibration means, or adjustable means.

The kaleidoscope means may have a variety of different constructions as described above. The length is also needs to be taken into consideration so as to create enough images of the display-unit or inner-medium. Too short a length of the kaleidoscope means will reduce the number of images of the display-units. The width of the mirrors of the kaleidoscope means also needs to arranged properly or the light intensity will be reduced because the distances are too big.

The current invention may incorporate other optics means including convex means, concave means, magnifying means, laser means, hologram means, focus adjust means, and/or more optics means, to cause the image to be more splendid and clearly seen by viewers.

The housing of the LED light may be arranged to house all necessary parts and accessories, including any combination of the following: optics means, kaleidoscope parts and accessories, tube means, a matrix of LEDs, a second or more LED light means for other light functions, circuit means, switch means, sensor means, remote means, control means, circuit means, IC means, prong means, power means, batteries, adaptor means, receptacle means, energy storage means, transformers, invertors, a top cover, a bottom base, interchangeable power means, power saving means, cost saving means, conductive means, conductive wires, angle adjust means, rotating means, focus adjustable means, motor means, gear set means, or other means for providing a perfect LED light for desk top or plug-in use, both indoors outdoors.

The LED light device may be an LED light arranged to be plugged into an electric outlet or be powered by direct current from batteries, rechargeable batteries, an AC adaptor with a jack, transformers, a solar power source, a chemical power source, a generator, or any other direct current power source, or alternatively may utilize interchangeable power sources by providing a housing member having a uniform compartment arranged to interchangeably receive different power source units, including at least one alternating current (AC) powered LED sealed unit that by itself meets all safety standards and requirements for certification by a safety agency, and that fit within the compartment; and at least one direct current (DC) powered LED battery pack that fits within the compartment, the AC power sealed unit and the DC powered battery pack each including at least one LED that serves as a light source for visible light beams; and parts selected from the group consisting of circuit means, trigger means, sensor means, timer means, IC means, prong means, battery rechargeable means, an AC adaptor, DC storage means, battery means, switch means, solar means, generator means, chemical energy means, PCB means, conductive means, attachment means, clip means, twist tight means, screw means, quick connect means, and rechargeable DC storage means, wherein the at least one LED is triggered when an electric signal output by the sealed unit or battery pack is applied to terminals of the at least one LED and thereby causes the at least one LED to emit light, and wherein the AC powered LED sealed unit and DC powered LED battery pack are arranged, when interchangeably fit into the uniform compartment of the LED light device, to cause the LED device to become a finished product with properties determined by properties of the sealed unit or battery pack, said properties including geometric shape, purpose, function, application, features, and predetermined lighting effects including timing, duration, brightness, or colors.

BRIEF DESCRIPTION OF THE DRAWINGS

FIG. 2 shows a comparison between a preferred embodiment of an LED device having kaleidoscope means according to the current invention and the LED device with kaleidoscope means of the above-discussed copending application, U.S. Patent Publication No. 2012/0200828. The preferred embodiment has a moving object or display-unit incorporated with a substrate frame to hold the LED light source and a reflection cone to cause the light beams to be more even, and an added film type optics means cause all LED light beams to be incident with even brightness on the moving object or display-unit so as to create a changeable pattern through the moving-means, which is preferably in this embodiment a super silent clock-movement that carries a light weight printed plastic piece, slide, or film to cause the kaleidoscope-image(s) to change as desired. This embodiment also has all related parts and accessories for more than one mirror-like reflect-means, projection means including multiple different optics lenses, a lens assembly, a substrate frame, a variety of choices of power source with conductive means, sensor means, Bluetooth means, switch means, remote control means, tube means, housing means and/or other parts and accessories, any of which may still fall within the scope of the current invention.

FIGS. 1A, 1B, 2A, and 2B show variations and detailed construction of the light device of FIG. 2.

FIGS. 3-11 illustrate different arrangements of reflective elements and the kaleidoscopic patterns generated thereby.

DETAILED DESCRIPTION OF THE PREFERRED EMBODIMENTS

Figure 1:
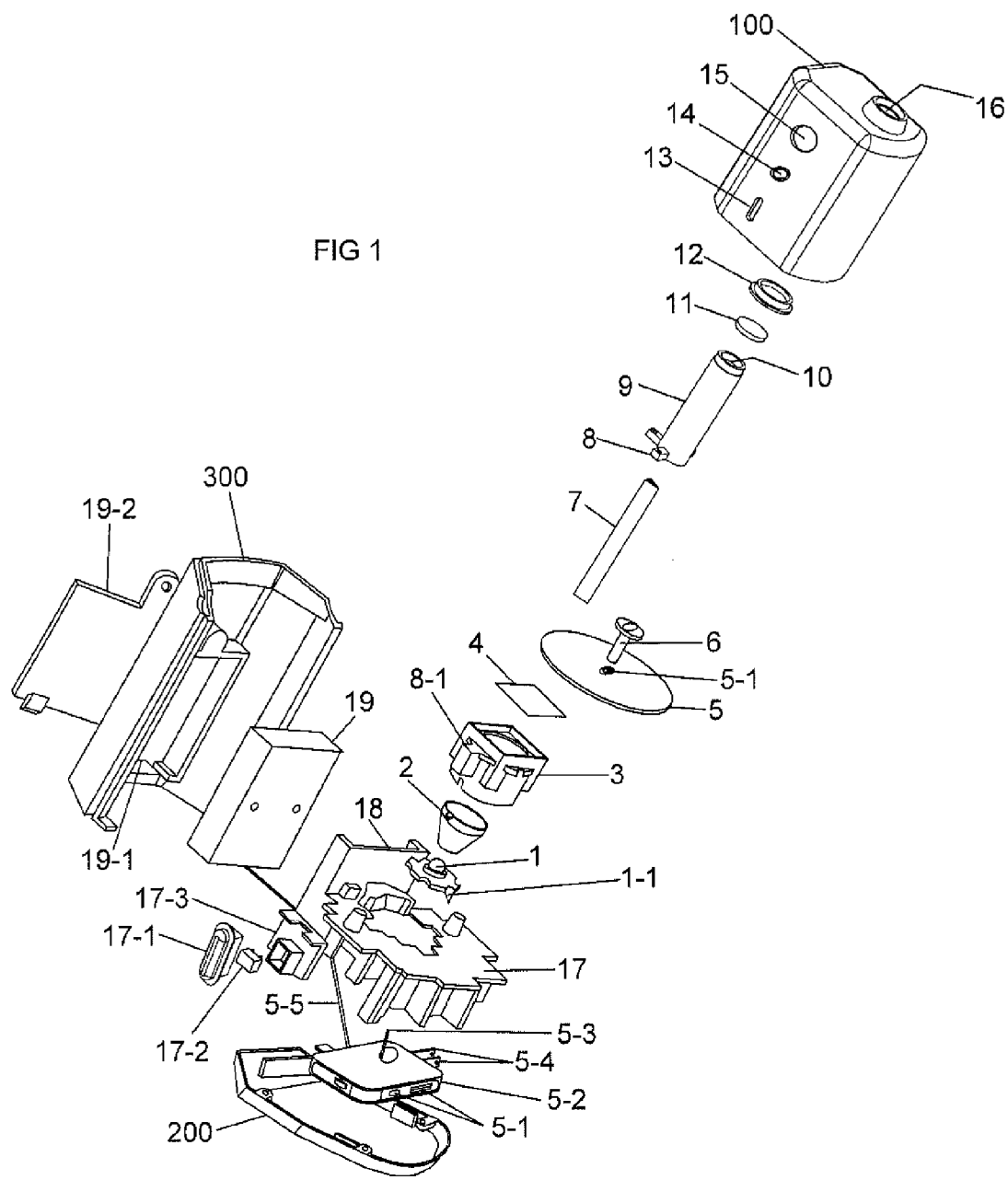
FIGS. 1, 1C, 1D, and 1E: shows a preferred embodiment of an LED device having a kaleidoscope means which has more than one mirror-like reflective means in a desired arrangement or assembly, an LED light source and reflective cone to assembled into a substrate frame, and an optics film to spread the LED light beams more evenly over a square area to direct parallel light beams into a subject or display unit. The display unit or subject has fastening means to connect with a silent moving means such as a clock movement or motor means to cause the subject or Display unit to move, resulting in projection of changeable kaleidoscope images through the top of the kaleidoscope mean's more than one mirror-like reflect-means and optics means to enlarge the kaleidoscope image and show the image on a surface 2 to 30 feet away from the LED light location. The LED device may be a plug-in or desktop type device powered by prong means from an AC outlet source or USB-means, battery means, adaptor means or any other DC storage means.
Figure 1C:
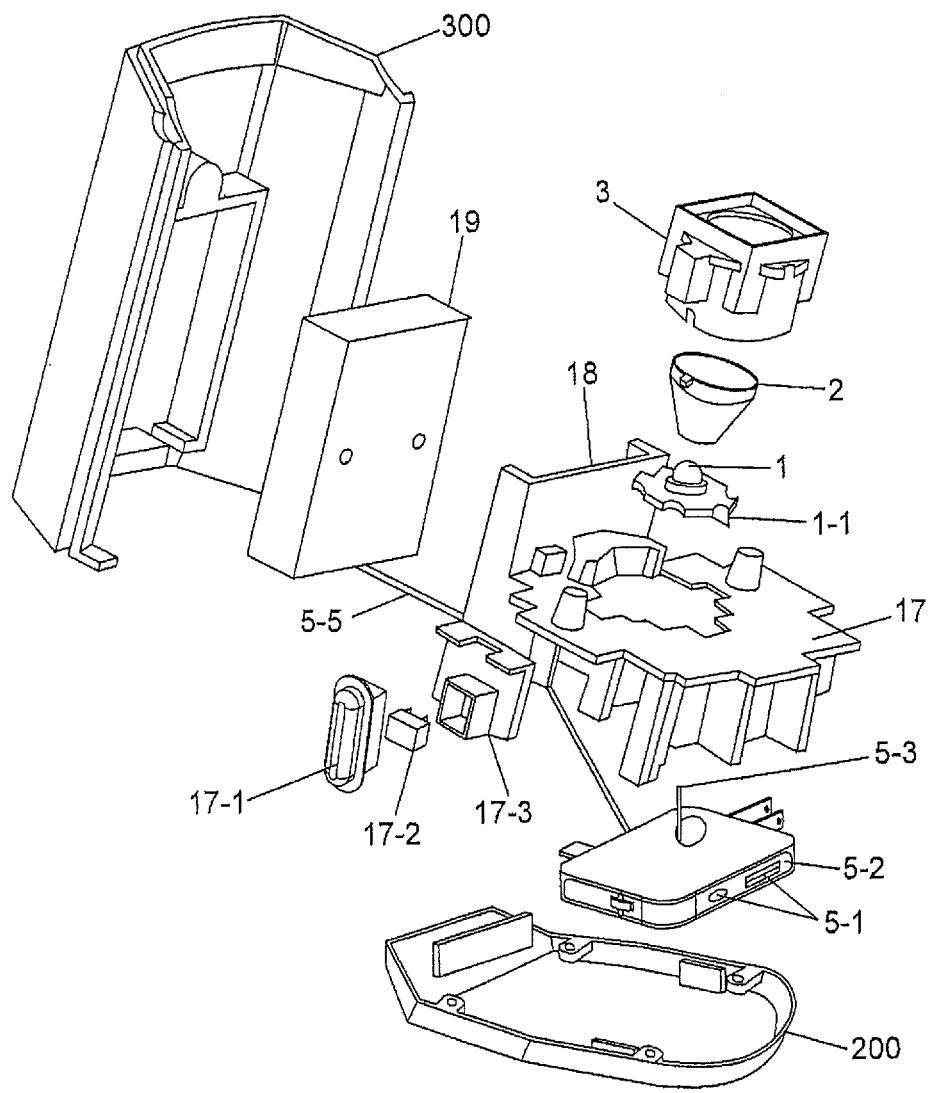
Figure 1D:
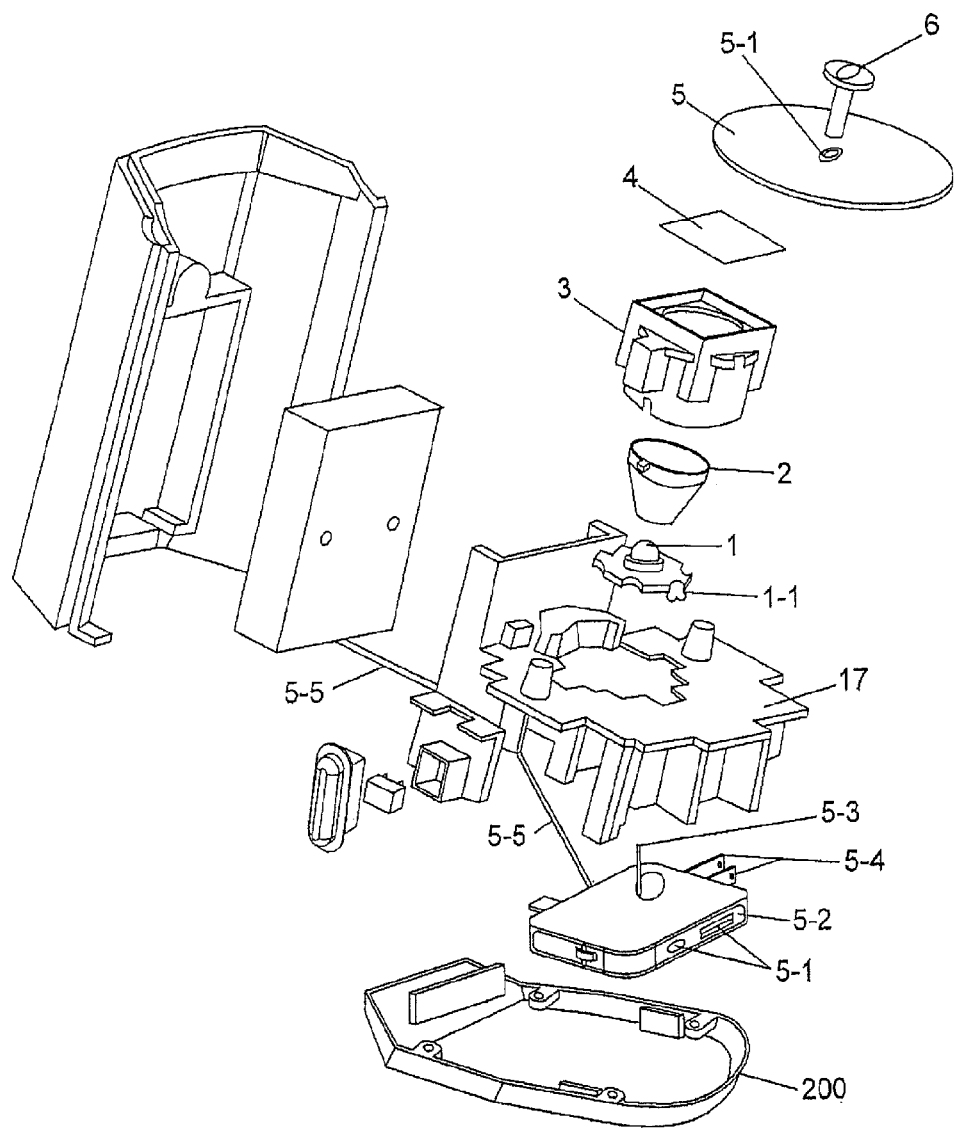
Figure 1E:
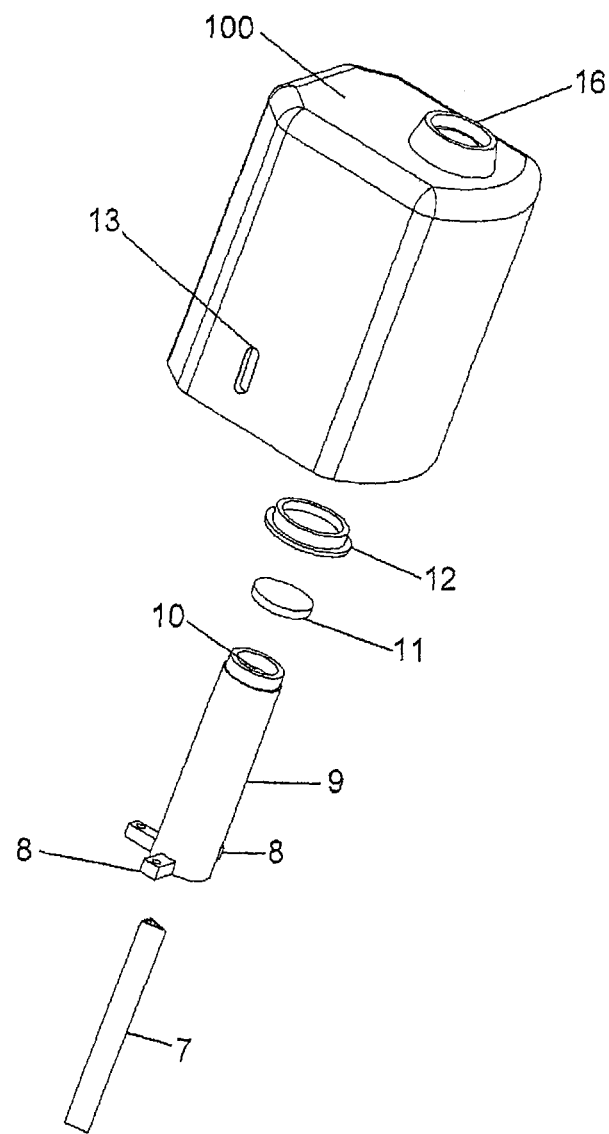

FIGS. 1, 1C, 1D, and 1E show a super bright LED light source (1) which may use a DIP-type or SMD type LED having a predetermined light emission angle to prevent too big a light emission angle, in which case LED light beams will be wasted or leak out of the kaleidoscope-means, projection-means, tube-means, or telescope-means installed on the anti-heat printed circuit board (1-1) and incorporated with a preferred or optional reflective-cone which may collect all LED light beams and cause the light beams to be emitted to the object(s), display-unit(s), film, slide, a printed plastic piece (5), liquids with different densities with selected floating stuff, a miniature-means, an inner-medium, a box with stuff, a container with stuffs, and/or a colorful light transmitting means. Hereof, only the printed plastic piece (5) is shown although equivalent or same function means may be substituted. The LED light means (1) and its PCB (1-1) and reflective cone (2) may be installed within a substrate (3) to achieve simple assembly and installation. The substrate (3) situated above the LED (1) and reflective cone (3) has one optics means (4) in the form of a sheet or film which is similar to a conventional optics film and has the function of causing the narrow viewing angle, bright-spot LED light beam to spread out and achieve even brightness over a big surface, thereby providing a very good photometric for an even brightness surface, which surface needs to be bigger than the top object(s) (5). The top object(s) (5) may, as described above, include any one of or combination of a display-unit(s), film, slide, printed plastic piece (5), liquids with different densities and selected stuff, miniature-means, an inner-medium, a box with stuff, a container with stuffs, and colorful light transmitting means.

The object(s) (5) preferably has colorful light beam transmitting means so that light beams from the LED light (1) will pass through the colorful object(s) (5) and the object's image will be reflected and/or retro-reflected by the more than one mirror-like reflect-means (7) to form a plurality of colorful and clear kaleidoscope-images.

The kaleidoscope-images are created by the more than one mirror-like reflect-means (7), the surfaces of which should be sufficiently clean and stain-free to reflect the object image perfectly. The reflect-means can be made of glass, plastic, metal, paper, foil or any other material applied by an appropriate method or treatment such as electroplating, painting, polishing, and other traditional skills for making such mirror-like reflect-means.

Figures 3A, 3B:
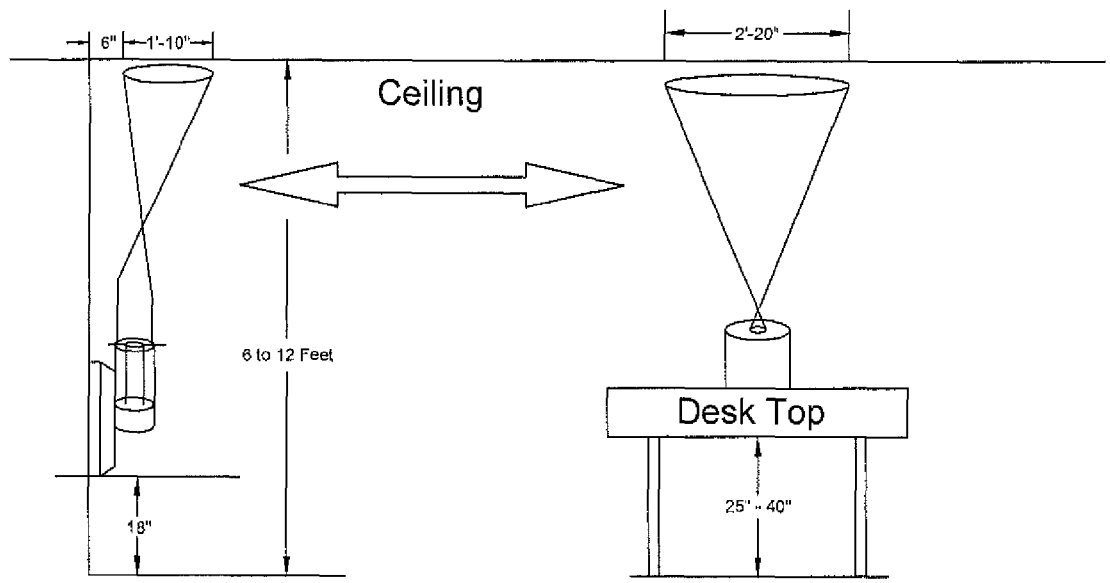
FIGS. 3A and 3B illustrate the range of projection of the light device of the preferred embodiments.
Figure 12:
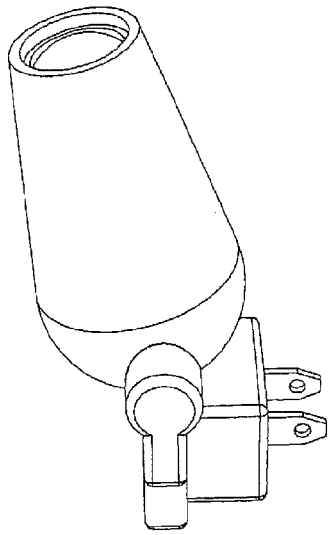
FIGS. 12 to 15 show different light device designs and the construction thereof.
Figure 13:
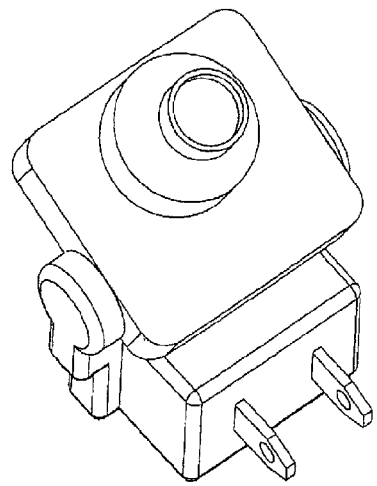
Figure 14:
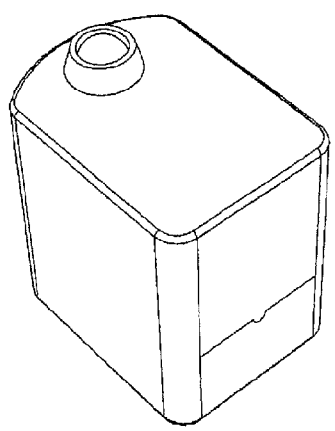
Figure 15:
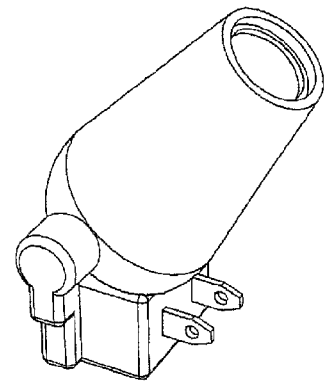

The more than one reflect-means may have any number from 1 to N (where N is any preferred number) and each of the mirror-like reflect-means may be connected with other mirror-like reflect-means at a predetermined angle to form desired configurations such as a 3 sided equilateral triangle (FIG. 3), an isosceles triangle (FIG. 5), 90 degree right triangle FIG. 4, a 22.5 degree angle triangle (FIG. 6), a 30 degree triangle (FIG. 7), a 60 degree triangle (FIG. 8), or other mirror configurations such as a 4 mirror triangle (FIG. 9), cone design triangle (FIG. 10), square design triangle (FIG. 11), or any other configuration of multiple mirrors, as disclosed in parent application Ser. No. 13/021,124.

The image of the object (5) be lighted by light beams from the LED (1) is reflected or retro-reflected within the elongate length of the mirror-like reflect-means (7) that form what may be referred to as a kaleidoscope-means. The kaleidoscope-means need to have a certain elongate length so the image of the object (5) can be reflected or retro-reflected multiple times, again and again and again. If the elongate length is too short, the number of images will be too few and not splendid enough. However, this depends on the design and market considerations. Each different kaleidoscope-means arrangement will result in a different kaleidoscope image as illustrated in FIGS. 3-11.

As shown in FIG. 1, the object (5) is located at a lower position in one end of the kaleidoscope-means (7) and the top end of the kaleidoscope-means (7) transmits a plurality of kaleidoscope images to a top projection means (10, 11, 12) that includes a tube means (9) with triangle holding-means (10) to prevent light beams from the LED (1) from leaking out, and in which can also be installed the more than one mirror-like reflect-means of the kaleidoscope means (7) as well as an optics lens (11) and optics cover (12) at a fixed location. The more than one mirror-like reflect-means hold means (10) may use tape, foam, a sponge or any other hold means capable of holding the more than one mirror-like means (7) so that they can be easily installed into the tube-means (9) or a telescope means (which is similar to a tube means). The tube means (9) preferably has screw holes (8) in at least on two places to fasten screws (not shown) through holes (8) to the substrate (17) and enable the tube means (9) to be secured with each of the following elements: LED (1), reflect cone (2), small substrate (3), optics-film (4), object (5), more than one mirror-like reflect-means (7), optics-lens (11), and optics-cover (12), all of which are well installed on top of the big substrate (17).

The object (5) illustrated in FIG. 1 is a rotating printed plastic piece that has one center fixing hole (5-1) and a long-pole screw means (6) to fix the printed plastic piece (5) on a moving-means pole (5-3) arranged to cause movement of the printed plastic piece (5). The reason for choosing the printed plastic piece instead of a film or slide as the object (5) is that it is durable and easily assembled, but the invention is not limited to a printed plastic piece. Other objects may be freely substituted depending on market or design requirements. The printed plastic piece (5) has a disc-shape to make it easy to print a character, cartoon, logo, message, geometric shape or art at predetermined positions, such as at 3-6-9-12 positions, or more positions such as 2-4-6-8-10-12 positions, or even more positions such as 1-2-3-4-5-6-7-8-9-10-11-12 positions. Because it is a disc shape, the plastic piece (5) can easily be incorporated with market available motor-means, clock-movement means (6-1), rotate-means, spin-means, a gear set, wheel means, belt means, or vibration means cause the object (5) to move with a predetermined speed, timing, duration, and/or direction and thereby change patterns as required. The pole (5-3) for the moving means may have a preferred design so that it can easily be connected with the long-pole screw means (6).

The circuit means (18) includes a PCB having all electric components necessary to make the LED(s) (1) turn on and turn off, and supply electric-signals to the moving-means, and may incorporate control means such as switch-means, remote-control means, PIR-means, infrared means, Bluetooth mean, sensor means, an integrated circuit, LED functions means, and other electric components and accessories including conductive means or electric wires to connect to the power source and supply power to the circuit means, control means, LED, and moving-means.

The power source may be selected from (1) a DC power source which can get power from batteries. USB means, adaptor means, generator means, transformer means, chemical means, solar power means or DC Energy storage means, and which will work with an LED without the need for any special current change so that the cost will be a little cheaper than (2) an AC power source, which needs a current change means such as an inverter, AC to DC transformer, or other electric conversion means or circuitry means to change AC power into DC power and drive the LED and moving means.

Another or alternative design is to use a clock movement as the moving means. A clock movement is also a DC powered device and can be powered by DC batteries or USB means, which can be a same or different power source from that used as the said LED light source. The invention is not limited to such an arrangement. For example, the power source can also be a plug-in outlet, a wire with a plug, batteries, USB wires, USB means, a USB port, an adaptor, a transformer with an adaptor, a solar power source, a DC energy storage means, or any other type of power source available from the marketplace.

FIGS. 1A and 1B show arrangements corresponding to the one disclosed in parent application Ser. No. 13/021,124, which includes a projection assembly (1-1 to 1-5) with an optics lens (1-5). This embodiment is also not limited to details illustrated in the drawings, but may encompass other devices with the same function, an equivalent function, same effects, or replaceable parts and having the goal of making colorful kaleidoscope patterns to be projected to any surface. The difference between FIGS. 1A and 1B is that the light device of FIG. 1A uses a simple LED light matrix (1-6) rather than the more traditional miniature-means, inner-medium, or display-units (1-6, 1-6a, 1-6b, and 1-6c) as the source of kaleidoscopic projection images of the type shown in FIGS. 3-11 as discussed above. Alternatively, an LCD or Lcos screen may be provided to create words, movies, or video as a substitute for the miniature-containing inner-medium or display-unit of FIG. 1B or the LED matrix of FIG. 1A.

Kaleidoscope means in the arrangement of FIG. 1A, the miniature-means of FIG. 1B are replaced by LED matrix (1-6), the LEDs of which are controlled to have a desired on-off time, color, brightness, and flashing frequency to create a variety of functions and effects. The projection means of each embodiment incorporates optics means, kaleidoscope means, control means, circuit means, LED(s), IC means, and/or power means to achieve splendidly colorful and changeable patterns for projection to any desired surface. The use of a matrix (1-6) of LEDs enables tens of millions of different light patterns to be created with a simple circuit activated by a switch, selected button, control means, sensor means, and so forth. Thus, whereas the traditional kaleidoscope unit only has a limited number of miniatures in one unit, the current invention can be used to generate a very large number of kaleidoscope patterns while using lower-temperatures LED without sacrificing brightness because of the large number of LEDs that can be included in the matrix. The LEDs can be turned on an off very quickly, faster than the eye's response time, to achieve splendid color changing light effects without the need for any material display-units or mechanism to change the relative position, orientation, and distances between the display units.

FIG. 2A shows the same arrangement as in FIG. 1B, but with a single LED 1-9, while FIGS. 2 and 2B show a plug-in LED device (1) having a changeable projection image (1g) created by the kaleidoscope-means of FIG. 2A and miniatures-means (1d) (1d1) (1d2) (1d3) (1d4) (FIG. 2A, 1-1, 1-6a, 1-6b), the position, location, and relative relationship of which can be changed by manual or automatic control-means such as gear-means (1 c) so as to present a variety of different sets of miniatures in different storage compartments (FIGS. 2B-1-11, 1-11' 1-11") on a gear-assembly wheel (1-c). The gear-assembly wheel (1-c) or other vibration means (FIG. 2A-1-6C), spin-means (not shown), or motion means (not shown) are connected with inner motor-means (not shown), moving device (not shown), vibration means (not shown), or other same function, equivalent device. A projection means (FIGS. 2A-1-1, 1-2, 1-3, 1-4, 1-7, 1-8) incorporated with optics means (1-5, 1-7, 1-7 a), kaleidoscope means, miniatures means (1 d) (1 d 1) (d2) (1 d 3) (1 d 4) (FIG. 2-1-6, 1-6 a, 1-6 b), control means (1-c) (FIG. 2A-1-6 c), circuit means, LED(s), IC means, and power means combined to generate splendid, colorful and changeable patterns that can be projected to any desired surface by one or more super bright LEDs.

The light device of this embodiment is illustrated as an AC light device arranged to be plugged into an AC outlet. It will be appreciated, however, that the device also can use a DC power source such as batteries, rechargeable batteries, an adaptor with a jack, a transformer, a generator, solar power, wind power, water power, chemical power, or any other power source to work with the current invention.

Furthermore the LED device may incorporate another light source to provide more than one light means and enable the LED device to have more than one light performance.

The LED device also may have different additional functions, which may be selected from functions of a consumer electronic device, communication device, optics device, or computer related device.

Unlike the arrangements of FIGS. 2 and 2B, the traditional kaleidoscope unit only has miniatures in one unit. In contrast, the gear-means 1-10 shown in FIG. 2B enables the user to use a hand to manually change the miniatures to and change the colorful, splendid spectrum projected to a desired surface. The gear-means (1-10) or bumper means (FIG. 2A-1-6 c) also can be incorporated with motor means—such as a toys cars' motor (not shown), vibration means (not shown), spin means—such as clock movement device (not shown) with timer, a sensor, a remote control, a motion sensor control, a PIR sensor control, a music sensor controller, a noise controller or any other electric or mechanical controller that can be adapted to change the position, location, orientation, height, attitude or other relationship between the different miniatures.

As explained above, FIGS. 3-11 disclose details of the reflective element construction of the kaleidoscope unit. The preferred construction of the kaleidoscope may have 2 mirrors, 3 mirrors, 4 mirrors or any desired number of mirrors at different angles to each other in order to get desired color patterns that can be projected by the projection assembly to desired surfaces including walls, a ceiling, a floor, outdoor surfaces, object surfaces, or any other surfaces. How splendid the colorful spectrum is depends on what material of miniatures is put into the storage compartments. Examples of suitable miniatures include any combination of colorful paper, plastic pieces, balls, dried flowers, metal pieces, solid pieces, copper pieces, cotton pieces, liquids, gels or any other objects available in the marketplace.

The illustrated plug-in light device may be located near the floor at a height of around 18 inches, which is the height of a typical wall outlet, and still project a colorful, enlarged, splendid kaleidoscope-image within a range of 2-30 feet away from the light device to the top ceiling, with the kaleidoscope-image being adjustable to any other locations by optional adjustment-means. For example, the illustrated light device may have an angle adjustable means.

If the light device is a desk top item, then it will normally be located at a height of around 25-40 inches from the floor and will project the kaleidoscope-image up to the ceiling at a distance of around 6-30 feet away from the light device. Also, the desk top model may have adjustable-means to make the kaleidoscope-image change from one location to another location at any time to project the image onto the top ceiling or all surrounding walls. The light device also can be designed for super wide angle projection to cover more than one surface of a room, living room, or any space of a house, office, or playground as needed. Details of suitable wide angle, adjustable projection devices are disclosed in the inventor's U.S. Pat. Nos. 7,832,917, 7,871,192, 8,002,456, 8,128,274, 8,231,260, which includes designs utilizing a half-ball, sphere, cylinder, or tube-shape housing that is rotatable over an angle of 120 to 270 degrees.

FIGS. 12 to 15 show various battery operated and plug-in unit designs suitable for use in connection with the kaleidoscope means and projection units of the present invention, the shape, design, or construction of which may be varied depending on market requirements.

It is to be appreciated that any same function or equivalent effects or alternative changes will still fall within the current invention's scope, including variations that use super bright LEDs rather than a matrix of LEDS, a variety of different objects, different mirror-like reflective element arrangements, different projection-means and optic lens assemblies to make enlarge images of tiny objects as needed, and so forth.

The invention claimed is:

1. An LED light device having a kaleidoscope image, comprising:
    at least one LED arranged to illuminate at least one object;
    an elongate kaleidoscope assembly including a plurality of reflective elements and having a predetermined length selected to provide multiple reflections of the at least one object at a first end of the kaleidoscope assembly and thereby create a colorful plurality of images of the at least one object at a second end of the kaleidoscope assembly;
    at least one projection unit for projecting the plurality of images of the at least one object from a wall outlet location or desk top surface location to a remote surface located between two and thirty feet away from the wall outlet location or desk top surface and for magnifying the plurality of images to provide large, clear, sharply focused and colorful images on the remote surface; and
    a power source and at least one means arranged in said housing to cause said at least one LED to emit light having desired functions or characteristics,
    wherein said at least one object is colorful and includes at least one of a display-unit, miniatures, a film, a slide, a printed plastic piece, colorful light transmitting elements, liquids having different densities, liquids without floating pieces, and liquids with floating pieces,
    wherein said projection unit includes optical elements selected from a concave lens, a convex lens, and a lens assembly for projecting and enlarging the image, and at least one of a collimator, tube or telescoping member, and a housing for preventing light leakage, wherein said reflective elements are arranged in one of the following configurations: (a) a configuration with three mirror elements; (b) a configuration with two mirror elements; (c) a configuration with four mirror elements; (d) a configuration with a tapered mirror element; (e) a configuration with a circular mirror element; and (f) a configuration with a predetermined number of mirrors and mirror-connecting angles selected to create desired kaleidoscope patterns, and wherein the LED light is arranged to be plugged into an electric outlet or other power source for desk top or plug-in application.

2. An LED light device having a kaleidoscope image, comprising:

at least one LED arranged to illuminate at least one object, the at least one object including at least one of a film, slide, transparent piece, translucent piece, inner medium, display unit, miniature, or colorful light transmitting element located above the at least one LED;

an assembly including a plurality of reflective elements and having a predetermined length selected to provide multiple reflections of at least one object at a first end of the assembly and thereby create a colorful plurality of images of the at least one object at a second end of the kaleidoscope assembly;

at least one projection unit for projecting the plurality of images of the at least one object from a wall outlet location or desk top surface location to a remote surface located between two and thirty feet away from the wall outlet location or desk top surface and for magnifying the plurality of images to provide large, clear, sharply focused and colorful images on the remote surface; and a power source and at least one means arranged in said housing to cause said at least one LED to emit light having desired functions or characteristics, wherein said projection unit includes optical elements selected from a concave lens, a convex lens, and a lens assembly for projecting and enlarging the image, and at least one of a collimator, tube or adjustable focus telescoping member, and a housing for preventing light leakage, wherein said reflective elements are arranged in one of the following configurations: (a) a configuration with three mirror elements; (b) a configuration with two mirror elements; (c) a configuration with four mirror elements; (d) a configuration with a tapered mirror element; (e) a configuration with a circular mirror element; and (f) a configuration with a predetermined number of mirrors and mirror-connecting angles selected to create desired kaleidoscope patterns, and wherein the power source includes prongs extending directly from said housing of the LED device and arranged to be plugged into an electric outlet.

3. An LED kaleidoscopic image light device having an interchangeable power source, comprising:

a kaleidoscope assembly arranged for forming a kaleidoscopic image; at least one LED arranged to illuminate at least one object, the at least one object including at least one of a film, slide, transparent piece, translucent piece, inner medium, display unit, miniature, or colorful light transmitting element located above the at least one LED;

an assembly including a plurality of reflective elements and having a predetermined length selected to provide multiple reflections of at least one object at a first end of the assembly and thereby create a colorful plurality of images of the at least one object at a second end of the kaleidoscope assembly;

at least one projection unit for projecting the plurality of images of the at least one object from a wall outlet location or desk top surface location to a remote surface located between two and thirty feet away from the wall outlet location or desk top surface and for magnifying the plurality of images to provide large, clear, sharply focused and colorful images on the remote surface; and a power source and at least one means arranged in said housing to cause said at least one LED to emit light having desired functions or characteristics, wherein said projection unit includes optical elements selected from a concave lens, a convex lens, and a lens assembly for projecting and enlarging the image, and at least one of a collimator, tube or adjustable focus telescoping member, and a housing for preventing light leakage, wherein said reflective elements are arranged in one of the following configurations: (a) a configuration with three mirror elements; (b) a configuration with two mirror elements; (c) a configuration with four mirror elements; (d) a configuration with a tapered mirror element; (e) a configuration with a circular mirror element; and (f) a configuration with a predetermined number of mirrors and mirror-connecting angles selected to create desired kaleidoscope patterns, and wherein the power source is a DC power source selected from a battery, USB power source, solar power source, chemical power source, generator, AC to DC transformer, and AC adaptor.

4. An LED light device having a kaleidoscopic image, comprising:

a. a kaleidoscope device having a plurality of reflecting elements;

b. at least one LED for emitting light beams that illuminate at least one object, the at least one object selected from colorful miniatures, an inner medium, a display unit, a colorful light transmitting element, and a liquid having different densities and/or floating elements;

c. a changing device including at least one of:

c1. a changing mechanism for causing the at least one object to change position, orientation, and relationships in order to vary the kaleidoscopic image, and c2. a changing circuit for changing a number of LEDs that are turned on to change illumination patterns;

d. control means in the LED device housing for controlling the changing device and light functions, brightness, color, and light effects of the LED light means;

e. a projection assembly with optical elements for projecting the kaleidoscopic image to a desired surface located from two to thirty feet away from the LED light; and f. a power source to supply power to the LED device.

5. A light device as recited in any one of claims 1, 2, 3, and 4, wherein the image has a changeable pattern generated by a moving mechanism selected from at least one of a motor, clock movement, spin mechanism, rotating mechanism, vibration mechanism, bumper mechanism, and gear set.

6. A light device as recited in any one of claims 1, 2, 3, and 4, wherein the at least one object includes at least one fixed piece and at least one moving piece.

7. A light device as recited in any one of claims 1, 2, 3, and 4, wherein the plurality of reflective elements are arranged on an inside of an elongate or tube-shaped structure.

8. A light device as recited in any one of claim 7, wherein the elongate or tube-like structure prevents light beam leakage to prevent loss of brightness.

9. A light device as recited in any one of claims 1, 2, 3, and 4, wherein the at least one object includes at least one display unit for displaying an image, art, movie, motion picture, digital data, geometric shape, word, signal, time, weather, and message, and wherein the light device has at least one tube-like structure to arrange the at least one display unit and the at least one optical element.

10. A light device as recited in any one of claims 1, 2, 3, and 4, wherein a number and angles of the plurality of reflective elements is selected to form a predetermined plurality of images of the at least one object.

11. A light device as recited in any one of claims 1, 2, 3, and 4, wherein the at least one object is a lighted display unit, and further comprising an adjustment mechanism for changing a position of a projected image.

12. A light device as recited in any one of claims 1, 2, 3, and 4 wherein a number of the reflective elements is three, the reflective elements forming an equilateral, isosceles, or right triangle to achieve different kaleidoscope effects.

13. A light device as recited in any one of claims 1, 2, 3, and 4, wherein the at least one object is a self-illuminated or glowing object, or is illuminated by an LED, LED unit, OEL lighting element, OLED, or other non-heat generating lighting element to prevent damage, deformation, loss of color, fading, melting, or softening of materials positioned adjacent the at least one object or lighting element.

14. A light device as recited in any one of claim 4, wherein the changing mechanism includes at least one of a rotating means, vibration means, spin means, tilt means, and magnet and coil means to cause the at least one object to change position and cause different kaleidoscope images to be projected by the projection assembly.

15. A light device as recited in claim 1, 2, or 4, wherein the light device is plugged into one of a wall outlet, power strip outlet, and power source outlet.

16. A light device as recited in claim 3, wherein the LED light is battery operated and receives charging power from a USB source or wireless charging system.

17. A light device as recited in any one of claims 1, 2, 3, and 4, wherein the kaleidoscope image is not projected to a surface that is less than two feet away or that includes the wall outlet into which the light device is plugged to prevent projection of an image that is too small to be seen or that is deformed.

18. A light device as recited in any one of claims 1, 2, 3, and 4, wherein the at least one object is a luminescent object or a display unit whose illumination is turned on and off by an electrical circuit.

19. A light device as recited in any one of claims 1, 2, 3, and 4, wherein the LED light has a control element selected from a Bluetooth controller, motion sensor, infrared sensor, remote control receiver, wireless control sensor, wired control sensor, electric-switch, and mechanical switch, the control element being incorporated with a timer or integrated circuit to achieve different functions effects.

20. A light device as recited in any one of claims 1, 2, 3, and 4, wherein the projection unit is arranged to project the kaleidoscope image over a wide angle to cover multiple surfaces.

* * * * *